(12) United States Patent
Hanson et al.

(10) Patent No.: US 9,097,375 B2
(45) Date of Patent: Aug. 4, 2015

(54) ROTARY JOINT SEAL FOR A DECOKING TOOL

(75) Inventors: Lloyd D. Hanson, Long Beach, CA (US); William B. Jones, Jr., Hacienda Heights, CA (US)

(73) Assignee: Flowserve Management Company, Irving, TX (US)

( * ) Notice: Subject to any disclaimer, the term of this patent is extended or adjusted under 35 U.S.C. 154(b) by 553 days.

(21) Appl. No.: 11/757,430

(22) Filed: Jun. 4, 2007

(65) Prior Publication Data
US 2008/0296405 A1  Dec. 4, 2008

(51) Int. Cl.
| F16L 27/08 | (2006.01) |
| F16L 23/18 | (2006.01) |
| C10B 33/00 | (2006.01) |
| F16J 15/00 | (2006.01) |

(52) U.S. Cl.
CPC ............. *F16L 27/0816* (2013.01); *C10B 33/00* (2013.01); *F16J 15/004* (2013.01); *F16J 15/008* (2013.01); *Y10S 277/914* (2013.01)

(58) Field of Classification Search
CPC .............. F16L 27/0816; F16L 23/167; Y10S 277/914; Y10S 277/929; Y10S 277/928
USPC ................... 137/580; 277/320, 563, 552, 914
See application file for complete search history.

(56) References Cited

U.S. PATENT DOCUMENTS

| 3,403,915 | A | * | 10/1968 | Roberts ......................... 277/511 |
| 3,532,111 | A | * | 10/1970 | Gaglio et al. ................. 137/385 |
| 4,296,952 | A |   | 10/1981 | McCracken |
| 4,900,039 | A | * | 2/1990 | Klecker et al. ................ 277/320 |
| 4,917,190 | A | * | 4/1990 | Coppedge ..................... 166/379 |
| 6,050,277 | A | * | 4/2000 | Purton et al. ............... 134/167 R |
| 6,349,947 | B1 | * | 2/2002 | Turner et al. ................. 277/641 |
| 6,637,454 | B1 | * | 10/2003 | Eley .......................... 137/355.26 |

\* cited by examiner

*Primary Examiner* — Atif Chaudry
(74) *Attorney, Agent, or Firm* — Dinsmore & Shohl LLP

(57) ABSTRACT

A rotary joint for a decoking tool. The rotary joint includes a seal assembly that has one or more primary seals and one or more secondary seals. The secondary seals become operative upon the presence of a leak in the primary seals such that the rotary joint can continue to be used until a scheduled maintenance outage. A selective vent is used to route leaking fluid so that one or the other of the primary and secondary seals can be activated.

13 Claims, 7 Drawing Sheets ly relates to device and method for
ROTARY JOINT SEAL FOR A DECOKING TOOL

BACKGROUND OF THE INVENTION

This invention relates generally to device and method for decoking delayed petroleum coke vessels, and more particularly to a rotary joint used to drive a drill stem and cutting tools, as well as an improved-reliability seal assembly used in the rotary joint. This invention even more particularly relates to a way to reduce operational downtime of a decoking tool by providing enhanced sealing of the rotary joint.

In a delayed coker operation of a petroleum refinery, residual feedstocks are first heated in a furnace and then moved to a vessel where the feed is allowed to coke by operating at a temperature sufficient to drive off the remaining volatile materials. After such heating the residue remaining in the vessel is essentially solidified petroleum coke. These vessels are currently as large as 32 feet in diameter and 150 feet in height.

The solid petroleum coke must be removed from the vessel in a decoking operation in order to prepare the coke for further hydrocarbon processing. Decoking is accomplished using high pressure water jets used to bore and cut the coke. The tool first bores a pilot hole through the coke bed and subsequently cuts the coke to the vessel wall, draining it out of the vessel through the pilot hole. This is accomplished by a tool or tools with arrays of vertical and horizontal nozzles to provide suitable jets for boring and cutting the coke bed. The tool or tools are rotated and reciprocated vertically through the vessel to accomplish the boring and cutting process.

Such tools are attached to a hollow drill stem through which the high pressure cutting water is conveyed to the rotating and reciprocating tool nozzles. The top end of the drill stem is attached to a rotary joint, which is used to bridge a non-rotating water supply line with the rotating drill stem and tool. The rotary joint is hoisted up and down within a tower above the coke vessel to impart the reciprocating motion to the assembly. The water supply line is in the form of a flexible hose that conveys the high pressure cutting water to the non-rotating portion of the rotary joint. The flexible nature of the water supply line allows it to accommodate the reciprocating motion of the assembly.

One important component within the rotary joint is the seal between the non-rotating and rotating portion of the rotary joint's water passage ways. Most current rotary joints in this service use lip type seals or packing, either of which tend to fail very quickly once a small leak develops. Such difficulties with seal leakage are exacerbated by the nature of the water being used in the decoking operation, as during the boring and cutting operations, the water is recycled, containing a quantity of suspended coke fines and related particulate. Changing a seal in a rotary joint can be time consuming and laborious process. Since delays in emptying the coke from the vessel result in loss of throughput in the overall refining process and concomitant operational impact on the refinery, having to shut down the process to change failed seals is commercially disadvantageous.

What is desired is a seal for the rotary joint that is not prone to failure. What is further desired is a seal that is easy and inexpensive to operate.

SUMMARY OF THE INVENTION

These desires are met by the present invention, where an assembly includes one or more primary seals and one or more secondary seals spaced apart from the primary seals. The primary seals actively seal the rotary joint, and a space between the primary and secondary seals is vented to atmosphere during normal operation and allows a failure of the primary seal to be detected. The secondary seals remain inactive during normal rotary joint operation, but once leakage from the primary seal is detected, the vent can be closed, activating the secondary seal. The secondary seal then allows continued operation of the rotary joint until the next planned outage. Closure of the vent is a simple process which has little impact on the coke removal time and mitigates any commercial impact on the refinery due to seal failure and change out.

According to a first aspect of the invention, a rotary joint is disclosed. The rotary joint includes rotatable and non-rotatable flowpaths in fluid communication with one another, as well as a seal assembly disposed between the flowpaths. The seal assembly is made up of one or more primary seals and one or more secondary seals. The secondary seal is positioned relative to the primary seal so that a space is formed between them. Such a space, which may be thought of as a vent area, can be placed in selective venting communication with the ambient atmosphere. To achieve such selective venting, a valve or other means can be positioned as part of a flowpath between the space and the ambient atmosphere. Thus, for example, in a first operating condition, while there is little or no leakage past the primary seal, the secondary seal is exposed to ambient pressures on both sides, hence not activated. In a second operating condition (which may, for example, coincide with a measurable leakage flow past the primary seal), the space between the primary and secondary seals can be, by operation of the valve or other means, cut off from the ambient environment, thereby promoting a pressure differential across the secondary seal such that it becomes activated.

Optionally, the selective venting communication means is a valve. In one form, a tortuous channel is set up such that any jetting action caused by the leakage being vented to the atmosphere is converted to substantially nonjetting leakage stream. In this way, risk of direct exposure to a high pressure jet of leaked fluid is reduced or eliminated. This can be effected by having a discharge hole or related orifice be adjacent a cavity wall such that the jetting of the discharged leakage through the hole impinges on the wall, causing diffusion of the jet. Additional flow impediments, such as deflectors, can be used to further cause jet diffusion. The assembly may also include a locking mechanism such that once a valve or related selective venting communication means is placed in a particular open or closed position, that position cannot be inadvertently changed. In this way, operator error or vibration due to prolonged operation will not cause the selective venting communication means to change position.

In another option, the first operating condition corresponds to a fluid flow situation where no measurable leakage is taking place to the space between the primary and secondary seals, while a second operating condition corresponds to a fluid flow situation where measurable leakage is taking place past the primary seal and into the space. In the present context, the term "measurable" corresponds to levels sufficient to cause an operator (in manual configurations) or a sensor (in automated configurations) to justify changing vent settings. In a manual form, this may be a level that an operator (through experience or other criteria) knows is indicative of a problem operating condition. In an automated form, this may be a threshold level over which the sensor is designed to send an appropriate notification or control signal. In one form, the primary seal may be configured as a lip seal. In another option, the assembly may also include a leakage detection device. The device, which may be in the form of a sensor, can be configured to send a signal to a controller, computer or other device to apprize an operator or the system of a leakage level in the rotary joint. Leakage detection may also be done manually.

According to another aspect of the present invention, a decoking tool is disclosed. The tool includes a fluid supply conduit with one or more fluid dispensing nozzles fluidly connected to the fluid supply conduit. The tool also includes, between the fluid supply conduit and the fluid dispensing nozzles, a rotary joint made up of a rotatable flowpath, a non-rotatable flowpath and a seal assembly disposed between the rotatable and non-rotatable flowpaths. In this way, the rotary joint allows the fluid dispensing nozzles to rotate relative to the fluid supply conduit, where such rotary motion allows the fluid dispensing nozzle or nozzles to perform at least one of a boring and cutting operation on solidified coke, such as that found in a coke vessel or drum. Such rotary motion improves the ability of the fluid to cut or bore into the solidified coke.

The seal assembly is made up of seals to prevent leakage of high pressure fluid (such as water used in a decoking operation) between the rotatable and non-rotatable flowpaths. These seals include a primary seal and a secondary seal disposed relative to the primary seal such that in the event of leakage past the primary seal or seals that exceeds a threshold level, a selective venting device placed in fluid communication with the space between the primary and secondary seals can be adjusted to change the amount of venting between such space and the ambient atmosphere. As mentioned above, such fluid dispensing nozzle of the tool can be a single nozzle or a combination, such as a cutting nozzle and a boring nozzle, where the latter is used to form a path along the substantially longitudinal dimension of a coke vessel while the former is used to rotate about the longitudinal axis such that water emanating therefrom can form radial cuts into the solidified coke. The device to effect the selective venting communication between the space and the ambient atmosphere may be in the form of a valve (such as a bleed valve) such that in a first operating condition, a vent is left open to the atmosphere so that the secondary seal is not pressurized or otherwise activated, while in a second operating condition, the vent is closed so that the secondary seal is activated. This activation of the secondary seal accompanies the recirculation and containment of the fluid that has leaked past the primary seal so that the leakage past the primary seal continues to be contained.

Optionally, the selective venting communication may be manually or automatically adjustable. In the case of the former, it can be configured as an adjustable valve with a plug, stopcock or related flow control mechanism that allows an operator, upon attainment of a threshold leakage level past the primary seal or seals, to adjust the valve at a time that minimizes impact on the operation of the decoking tool. In the case of the latter, the tool may further include a leakage sensing device that can be used in conjunction with the valve (and related control equipment) to measure leakage levels. Such sensor may deliver the measured level to an output device, such as a gauge, readout screen, audible warning device or the like so that an operator or control mechanism (such as a microprocessor-controlled system) can make appropriate adjustments. Regardless of whether a sensor is included, the valve may further include a lock to keep the valve in one of an open position or a closed position so that the position cannot be inadvertently changed, such as by vibration, human error or the like. The lock may include safety wire or other device that both keeps the valve in a preferred position, as well as enable ease of adjustment by an operator.

According to another aspect of the invention, a method of operating a rotary joint for a decoking tool is disclosed. The method includes configuring a seal assembly in the rotary joint to comprise one or more primary seals and one or more secondary seals with a venting region (or space) disposed fluidly between them. In this way, when a leakage level that exceeds a predetermined threshold past the primary seal occurs, the secondary seal can be activated to substantially contain the leakage. The method further includes flowing a decoking fluid through the rotary joint, checking for leakage of the fluid around the primary seal or seals, and venting the region or space to the atmosphere until the leakage exceeds a predetermined threshold. Such a predetermined threshold could be based on an amount of leakage below which a user may determine is acceptable.

Optionally, the venting comprises operating a bleed valve. In this way, the venting is selective in that it can be turned on, off or set in between an on and off position. In addition, checking for leakage may include operating an automated leak detection device, such as a sensor signally coupled to a controller, leakage notification device (such as an audible or visual alarm) or both. The selectively venting may include shifting a sealing load from the primary seal to the secondary seal such that any leakage past the primary seal is picked up by the secondary seal. In the present context, a sealing load may be a force due to the presence of a fluid that presses against the seal. Adjustment of the bleed valve or other shifting such a sealing load is such that it can be accomplished without having to shut the tool down. For example, an operator may make an adjustment that can be effected without having to suspend operation of the decoking tool. In another option, the jetting action reduction can be effected by placing one or more deflectors in the leakage discharge path. In still another option (which may or may not be combined with the deflectors), the jetting action reduction occurs by placing the bleed valve at least partially in or adjacent the seal assembly such that upon discharge of the leakage from the valve, the leakage impinges upon a wall formed between the valve and seal assembly.

BRIEF DESCRIPTION OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENT

Figure 1:
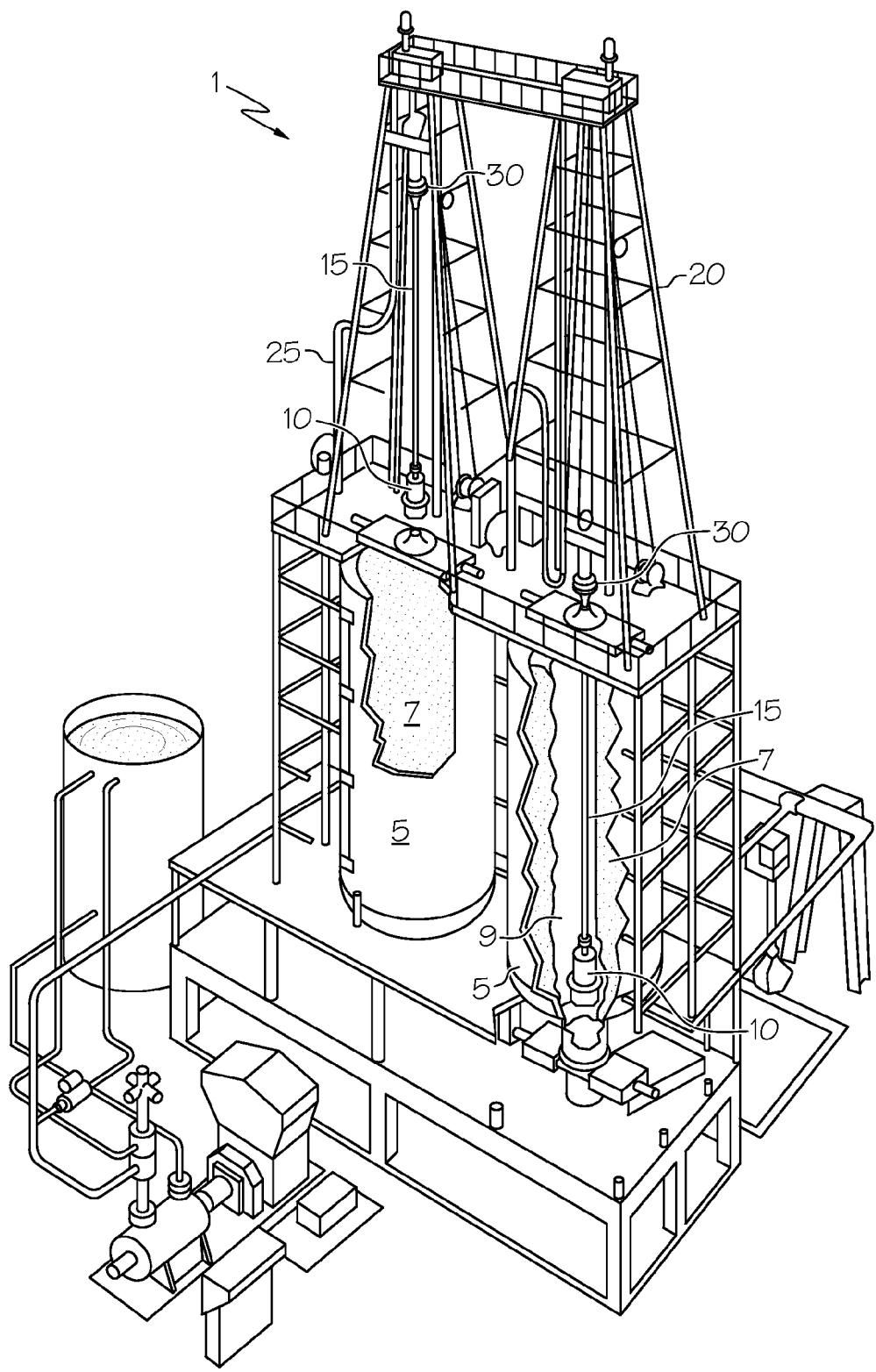
FIG. 1 is a view of a decoking system which can use the rotary joint seal assembly of the present invention.

Referring first to FIG. 1, a decoking system 1 includes a pair of coke vessels 5, a cutting and boring tool 10, a drill stem 15, a tower 20, a flexible water supply hose 25 and a rotary joint 30. The vessel 5 on the left shows a partial cutaway, where the vessel 5 is full of coke 7 that needs to be removed, while the vessel 5 on the right shows the cutting and boring tool 10 being lowered through the coke 7 during boring of a pilot hole 9. The cutting and boring tool 10 is mounted at the lower end of the drill stem 15 such that both can move translationally (specifically, vertically) along the length of vessel 5. The upper end of drill stem 15 is coupled to the rotary joint in such a way that the cutting and boring tool 10 and drill stem 15 can rotate about a longitudinal axis formed by both in response to water passing through the radially-oriented nozzles (not shown) of the cutting and boring tool 10. The flexible water supply hose 25 is also coupled to the rotary joint 30 and is used to supply high pressure water to the cutting and boring tool 10. While the cutting and boring tool 10 is mentioned as a single device, it will be appreciated by those skilled in the art that such functions may be separated, as a separate tool that provides cutting and a separate tool for cutting may be employed. The construction of the rotary joint 30 is such that it acts as the intermediary between the flexible, yet non-rotational water supply coming from the flexible water supply hose 25 and the rigid, yet rotational drill stem 15 and the cutting and boring tool 10. Tower 20 acts as a hoist to lift and lower the cutting and boring tool 10, drill stem 15, flexible water supply hose 25 and rotary joint 30.

Figure 2:
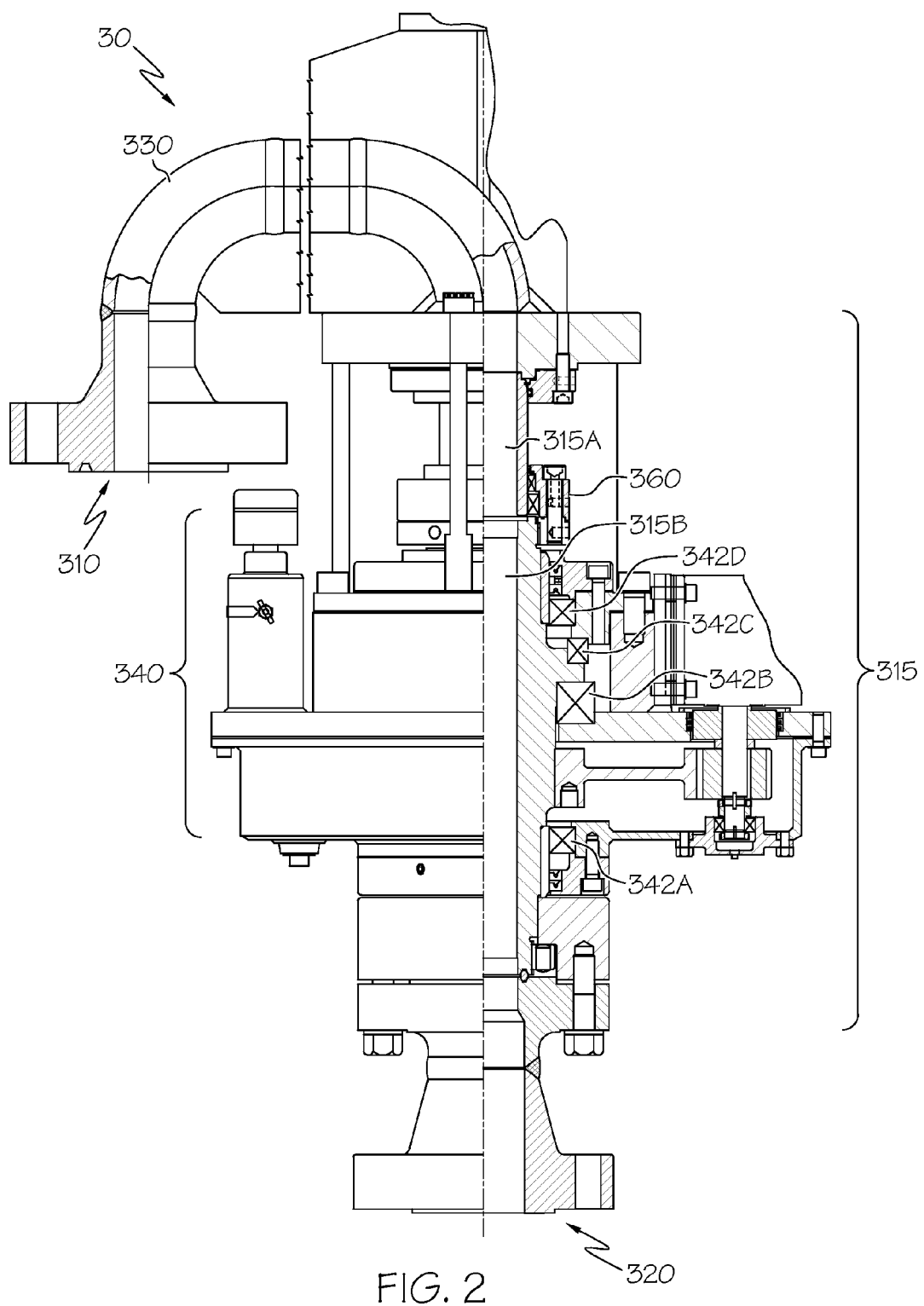
FIG. 2 is a partial cutaway rotary joint showing placement of primary and secondary seals from the seal assembly.

Referring next to FIG. 2, details of the rotary joint 30 are shown. Inlet 310 and outlet 320 are disposed on opposing fluid sides of the rotary joint 30, and are in fluid communication with one another through an elongate flowpath 315 that is situated along the generally longitudinal dimension of the rotary joint 30. In this way, inlet 310 corresponds to the portion of the rotary joint 30 where the incoming water from the flexible water supply hose 25 is introduced to the rotary joint 30, while the outlet 320 corresponds to the portion of the rotary joint 30 that leads to the drill stem 15. Flow rates and pressures of water coming from the water supply hose 25 tend to be rather high, with flow rates of up to a couple of thousand gallons per minute, and pressures of between 3000 and 5000 pounds per square inch. The inlet 310 includes a generally U-shape, while the outlet 320 forms part of a generally linear shape. Flowpath 315 includes both a non-rotatable portion 315A adjacent inlet 310 and a rotatable portion 315B adjacent outlet 320. A rotatable coupling 340 circumscribes flowpath 315 and acts as a transition of the rotary joint 30 from the non-rotatable portion 315A to the rotatable portion 315B. A series of bearings 342A-342D (shown notionally as roller bearings) allow rotational movement of the coupling 340 while leaving a sleeve or other conduit making up the non-rotatable portion 315A of flowpath 315 stationary so that it is rigidly affixed to the inlet 310 of the rotary joint 30.

Figure 3A:
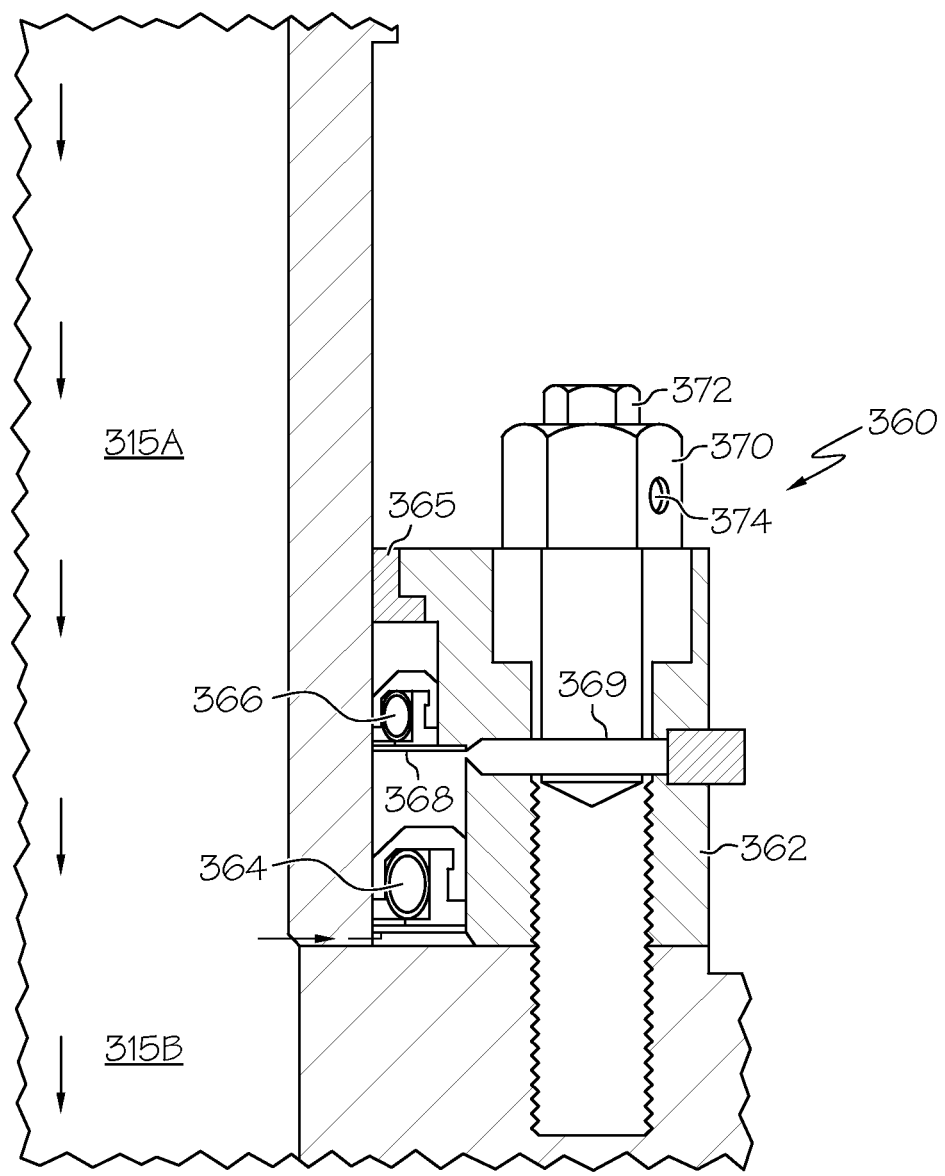
FIG. 3A is a detailed view of the seal assembly of FIG. 2 with an open vent during normal rotary valve operation.
Figure 3B:
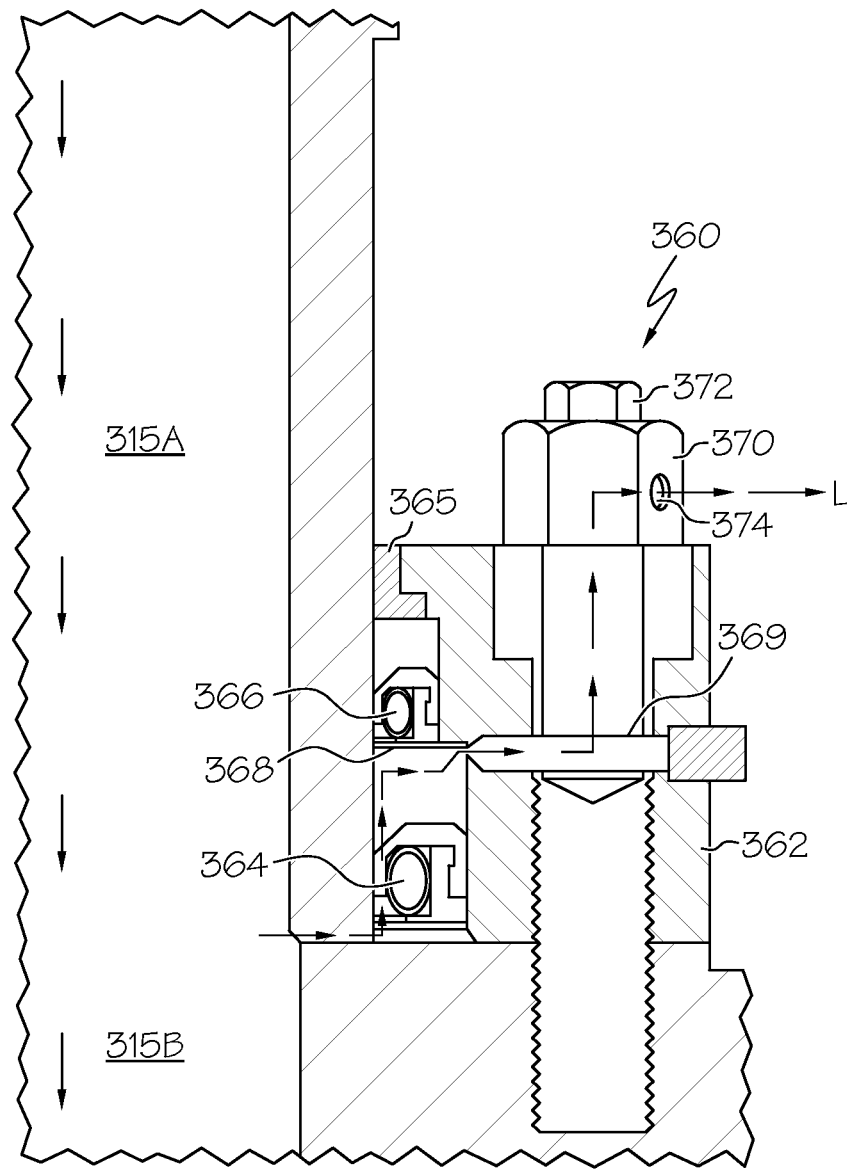
FIG. 3B is a detailed view of the seal assembly of FIG. 2 after a leak has developed in the primary seal.
Figure 3C:
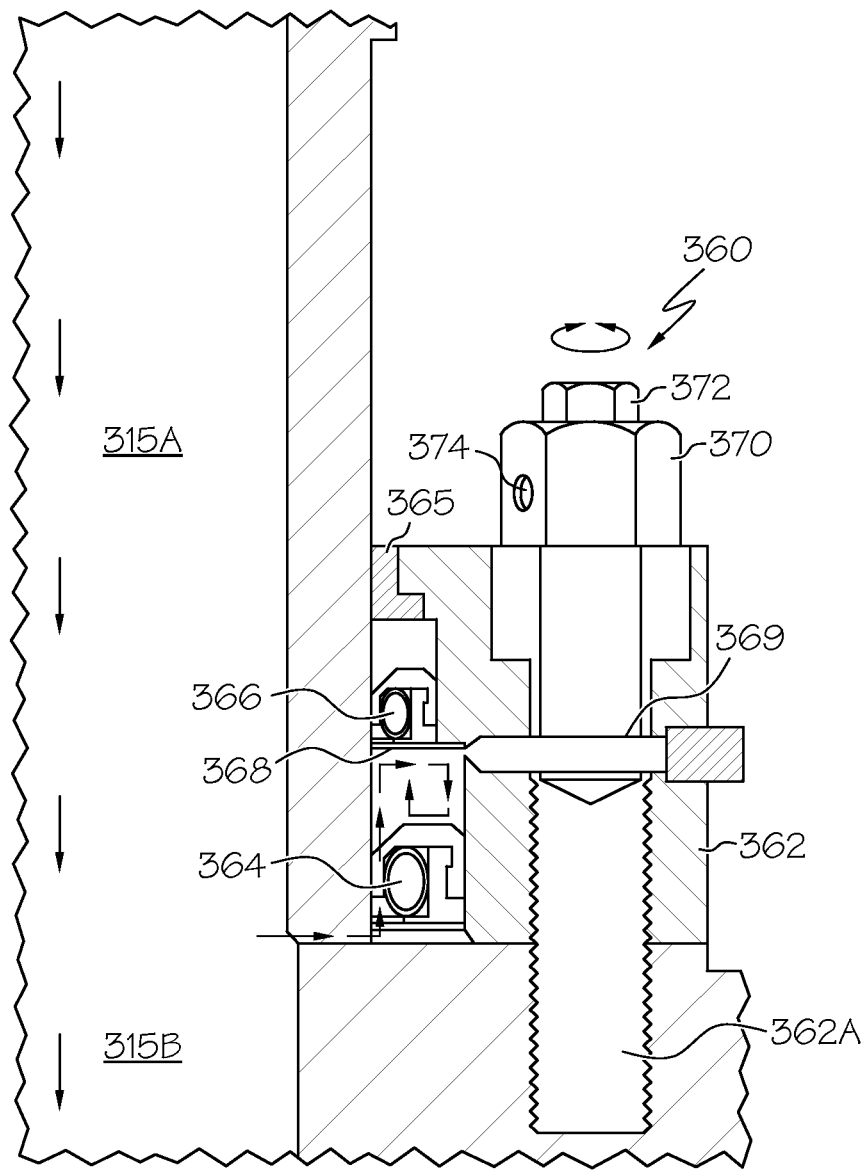
FIG. 3C is a detailed view of a closed vent leak path that may be set up to avoid the leakage shown in FIG. 3B being vented to the atmosphere.

Seal assembly 360 is used to prevent leakage where the first and second portions 315A, 315B of flowpath 315 join. Referring next to FIGS. 3A through 3C, details of seal assembly 360 with primary seal 364 and secondary seal 366 are shown. Each of the three figures depicts a different operating condition, including for an open vent leak path during normal operation (FIG. 3A), an open vent leak path during operation where leakage around the primary seal 364 occurs (FIG. 3B) and a closed vent leak path where the secondary seal 366 is activated (FIG. 3C). The non-rotatable portion 315A is shown as the aforementioned sleeve or washpipe, while gland 362 rotates relative to the sleeve 315A. The primary seal 364 is situated between the sleeve 315A and the gland 362 such that during normal rotary joint 30 operation, the primary seal 364 is active. Secondary seal 366 is inactive during normal operation, insofar as it is exposed to atmospheric pressures on both sides. Specifically, its upper side is exposed to atmospheric pressure conditions through the space between the secondary seal 366 and the close-clearance bushing 365, while the lower side is exposed to atmospheric pressure conditions through a vent passage 368 that is positioned between the primary and secondary seals 364, 366, and is left open such that fluid communication between the space defined between the primary and secondary seals 364, 366 and the ambient environment is maintained. This has the effect of keeping the pressure off the secondary seal 366 during normal operation, while allowing detection of leakage downstream of the primary seal 364.

Figure 4A:
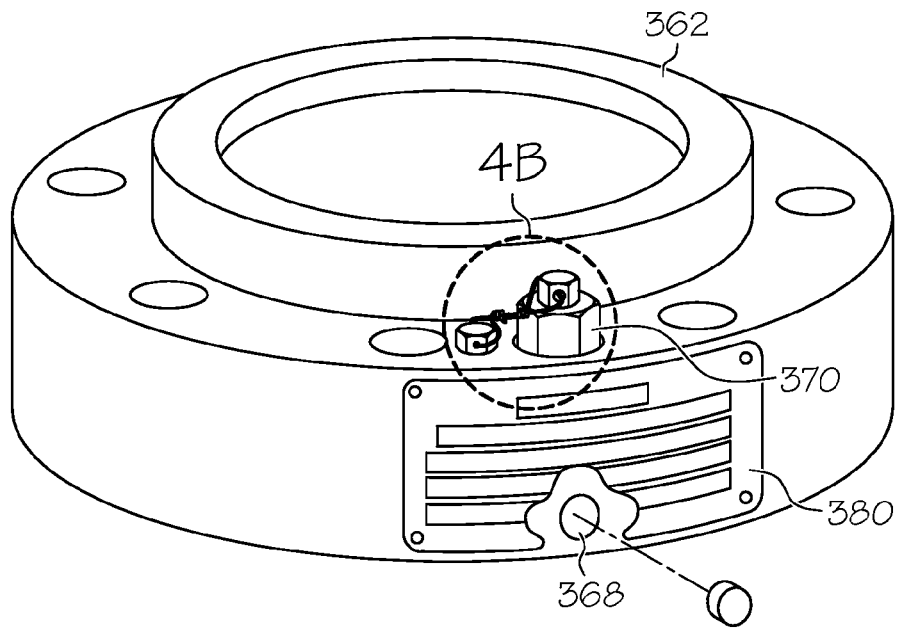
FIG. 4A is a view of a venting arrangement within the seal assembly.
Figure 4B:
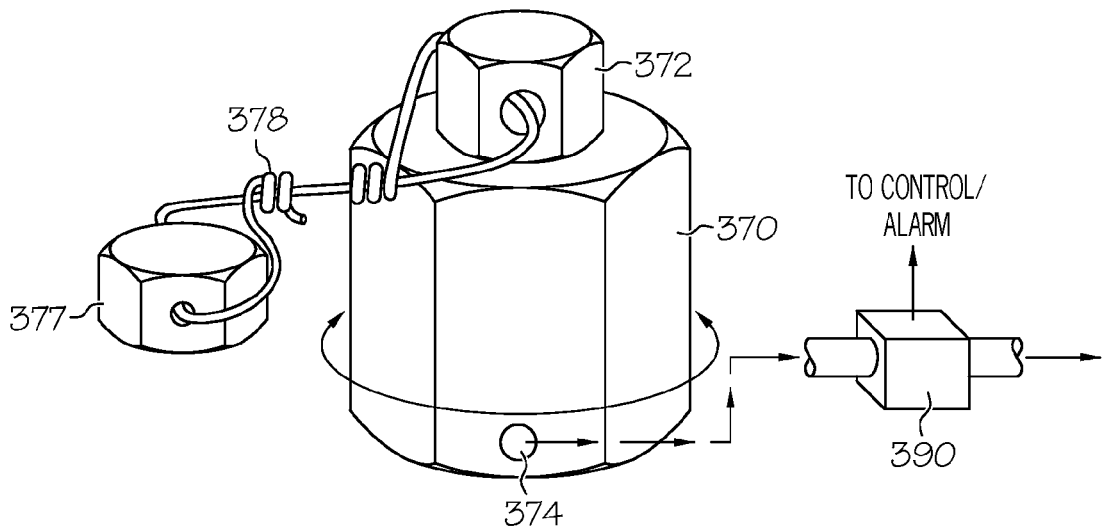
FIG. 4B is a detailed view of a valve used to effect venting to atmosphere.

Referring next to FIGS. 4A and 4B in conjunction with FIGS. 3A through 3C, one means for venting and blocking the space between the primary and secondary seals 364 and 366 is shown. A seal gland 362 acts as a housing that is disposed about the interface between the first and second portions 315A, 315B of flowpath 315. The primary and secondary seals 364, 366 are situated in the region between the gland 362 and the washpipe of the non-rotatable portion 315A of the flowpath 315. The vent passage 368 of FIGS. 3A through 3C is fluidly coupled to a closure mechanism through a radial conduit 369, which may be formed in the body of gland 362 through any well-known means, such as cross-drilling or the like. The closure mechanism may be made up of a bleed valve 370 the body of which is mounted in a generally vertical recess 362A in the gland 362 such that a fluidly continuous path from the vent passage 368 through the conduit 369 and into the recess 362A and valve 370 is formed. As shown with particularity in FIG. 4A, an identifying plaque or related label 380 may be placed on the lower part of the gland 362 to provide indicia of the valve, including operating conditions, scheduled maintenance times or the like.

Leakage is detected either visually by an operator (such as by perceiving the presence of a high pressure fluid emanating from the area around the rotary joint), or automatically by a sensor 390 (shown in FIG. 4B) that can be connected to an alarm or related warning. During normal operation (such as that shown in FIG. 3A), valve 370 is opened such that vent passage 368, conduit 369 and the space between the primary and secondary seals 364 and 366 is open to the ambient atmosphere.

As shown with particularity in FIG. 4B, a plug 372 of the bleed valve 370 allows rotation of the valve 370 to expose the vent area adjacent the primary and secondary seals 364, 366 to the atmosphere through a bleed hole 374 formed in the bleed valve 370 body. By rotating the plug 372, the relationship between the bleed hole 374 and an internal passage (not shown) can be altered so that the fluid path from the seal assembly 360 to the ambient environment can be selectively cut off. The size of the bleed hole 374 is limited so that, in the event of a primary seal 364 failure, the leakage will be visible and obvious, but not so great that the leakage will force shutdown of the rotary joint 30 and immediate replacement of the primary seal 364. By proper control of the size of hole 374, discharge of the high pressure fluid can be metered. A locking mechanism 377 may be attached to the plug 372 to prevent the letter from inadvertent rotation. Locking mechanism forms a fixed relationship with gland 362, such as by screwing, welding, integral forming or other related fastening, and when used in conjunction with safety wire 378, can keep the preferred orientation of valve 370. Thus, once the valve 370 is placed in a particular open or closed position, that position remains. This prevents vibration or accidental contact from changing valve 370 position, thereby preserving the desired vent setting. By having the plug 372 readily accessible to an operator, adjustment of the valve 370 is simplified.

Sensor 390 can be fluidly coupled to any one of numerous locations along the leakage path in order to detect leakage therefrom. Once leakage of the primary seal 364 (such as that shown in FIG. 3B) is detected, the vent passage 368 can be blocked off by adjusting valve 370, where once closed, cuts off access to the ambient environment, thereby preventing further leakage and making the secondary seal 366 fully active. In this way, the pressurized fluid that leaks past the now-failed primary seal 364 encounters the secondary seal 366. With nowhere to go, the leaked fluid will build up pressure in the space between the two seals 364, 366 so that the secondary seal 366 is exposed to the high pressure fluid. The amount of leakage past the primary seal 364 deemed sufficient to justify adjusting valve 370 may vary depending on the operational needs of the decoking tool, and is known to one skilled in the art how much leakage is acceptable. The secondary seal 366 is of such integrity that it allows operation for a reasonable period of time until a planned outage of the vessel can be reached and the primary seal 364 changed out. As shown with particularity in FIG. 4B, the sensed leakage may cause the sensor 390 to send a signal to a controller or alarm so that either automated or manual adjustment in the valve 370 setting may be initiated.

Figure 5:
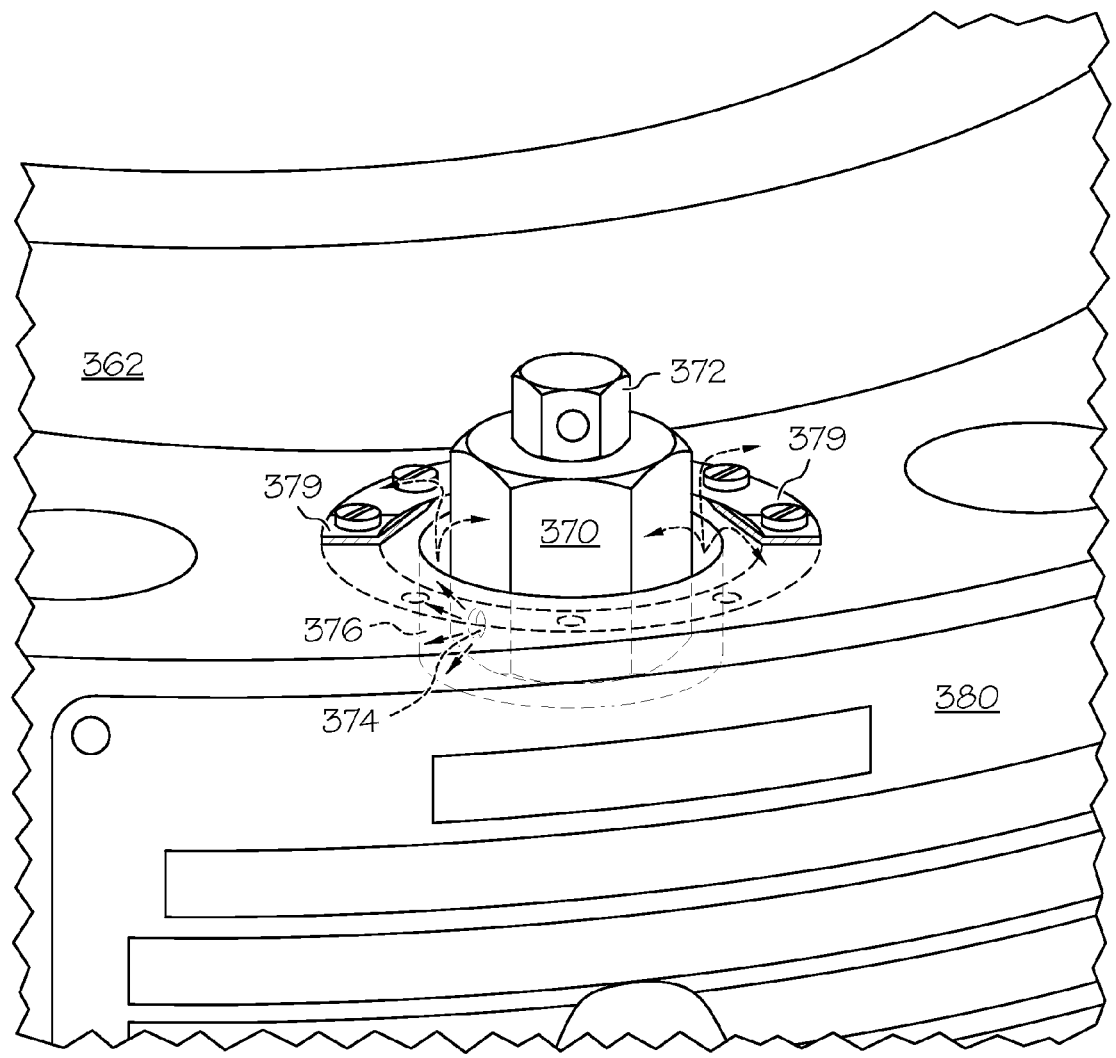
FIG. 5 is a view of how to reduce the intensity of high pressure leakage.

Referring next to FIG. 5, features used to reduce the direct flow of a high pressure jet of leaked fluid is shown. As can be seen, valve 370 is countersunk into gland 362 such that a chamber 376 is formed between the inner wall of gland 362 and the faceted outer surface of valve 370. Since the leakage path from the seal assembly 360 terminates at bleed hole 374 formed in valve 370, and the pressures associated with the leakage could be excessive, the placement of the bleed hole 374 within the chamber 376 acts to cause direct impingement of the leakage onto the inner wall of the gland 362, thereby acting to diffuse the leakage jet. Further diffusion of the jet can occur through the use of surface-mounted deflectors 379. In this way, a tortuous flowpath is set up, such that the high pressure jet can be diffused and redirected to a more safe pressure level. While the deflectors 379 are shown notionally as a pair of generally planar panels, it will be appreciated by those skilled in the art that other shapes, as well as adjustable features, are also contemplated.

Having described the present invention in detail and by reference to the embodiments thereof, it will be apparent that modifications and variations are possible without departing from the scope of the invention in the following claims.

What is claimed is:

1. A decoking tool assembly comprising:
   a water supply;
   a conduit cooperative with said water supply to deliver a recycled flow of at least a two thousand gallons per minute of water that is pressurized to between three thousand and five thousand pounds per square inch;
   at least one fluid dispensing nozzle in fluid communication with said conduit such that upon delivery of said water to said at least one fluid dispensing nozzle, said at least one fluid dispensing nozzle rotates relative to said conduit such that said water being dispensed therefrom impacts solidified coke and retains at least a portion therein; and
   a rotary joint coupled between said conduit and said at least one fluid dispensing nozzle to facilitate rotational movement therebetween, said rotary joint comprising:
   a rotatable flowpath;
   a non-rotatable flowpath in fluid communication with said rotatable flowpath; and
   a seal assembly disposed along a longitudinal dimension of said rotary joint formed by said rotatable and non-rotatable flowpaths, said seal assembly comprising:
   a primary seal configured to limit leakage in a region defined between said rotatable and non-rotatable flowpaths;
   a secondary seal disposed longitudinally relative to said primary seal such that said primary seal and said secondary seal define a space between them that is in selective venting communication with the ambient atmosphere; and
   a device to effect said selective venting communication between said space and the ambient atmosphere such that during normal operation of said rotary joint, said space is vented to the ambient atmosphere to keep said secondary seal inactive by having a relatively balanced atmospheric pressure across said secondary seal, while during operation of said rotary joint where leakage past said primary seal is present, said space is substantially decoupled from the ambient atmosphere such that a pressure differential across said secondary seal is formed by said leakage and the ambient atmosphere, said device configured such that establishment of said active secondary seal takes place under said normal operation.

2. The tool of claim 1, wherein said device comprises a valve.

3. The tool of claim 2, wherein said valve comprises a lock configured to keep said valve in one of an open position or a closed position so that said position cannot be inadvertently changed.

4. The tool of claim 1, wherein said tool further comprises a leakage sensing device cooperative with said space formed between said primary and secondary seals such that upon said leakage that exceeds a predetermined threshold level, said leakage sensing device can provide notorious indicia of said leakage.

5. A method of operating a decoking tool, said method comprising:
   fluidly coupling said tool to a water supply;
   configuring a rotary joint in said tool to comprise a seal assembly comprising at least one primary seal and at least one secondary seal along a longitudinal dimension of said rotary joint with a selectively operated venting region disposed fluidly between them such that upon attainment of a leakage level that exceeds a predetermined threshold past said primary seal, said selectively operated venting region can be manipulated such that secondary seal substantially contains said leakage;
   flowing a decoking fluid from said water supply through said rotary joint to deliver a recycled decoking fluid flow of at least a two thousand gallons per minute that is pressurized to between three thousand and five thousand pounds per square inch;
   checking for leakage of said fluid around said at least one primary seal such that during operation of said rotary joint where substantially no leakage past said primary seal is detected, said selectively operated venting region is vented to the ambient atmosphere to keep said secondary seal inactive by having a relatively balanced atmospheric pressure thereacross, while during operation of said rotary joint where leakage past said primary seal is detected, said selectively operated venting region is substantially decoupled from the ambient atmosphere such that a pressure differential across said secondary seal is formed by said leakage and the ambient atmosphere, said selective operation of said venting region is configured to take place under normal operation of said decoking tool; and venting said region until said leakage past said primary seal is detected.

6. The method of claim 5, wherein said venting comprises operating a bleed valve.

7. The method of claim 5, wherein said checking for leakage comprises operating an automated leak detection device.

8. The method of claim 7, wherein said automated leak detection device comprises a sensor signally coupled to at least one of a controller and a leakage notification device.

9. The method of claim 5, whereupon attainment of a predetermined threshold beyond which said leakage past said primary seal is detected, said venting is closed such that a sealing load that was imparted on said primary seal is shifted to said secondary seal.

10. The method of claim 9, wherein said shifting a sealing load can be effected without having to suspend operation of said decoking tool.

11. The method of claim 5, further comprising reducing jetting action from any leakage passing through said valve prior to passage of said leakage to the ambient atmosphere.

12. The method of claim 11, wherein said jetting action reduction comprises placing at least one deflector in a discharge path formed by said passage of said leakage to the ambient atmosphere.

13. The method of claim 11, wherein said jetting action reduction comprises placing a valve that is configured to vent said leakage relative to said seal assembly such that upon discharge of said leakage from said valve, said leakage impinges upon a wall formed between said valve and said seal assembly.

* * * * *

UNITED STATES PATENT AND TRADEMARK OFFICE
CERTIFICATE OF CORRECTION

PATENT NO. : 9,097,375 B2
APPLICATION NO. : 11/757430
DATED : August 4, 2015
INVENTOR(S) : Lloyd D. Hanson et al.

It is certified that error appears in the above-identified patent and that said Letters Patent is hereby corrected as shown below:

Specification

Col. 1, Line 53,
"a seal in a rotary joint can be time consuming and laborious" should read
--a seal in a rotary joint can be a time consuming and laborious--;

Col. 6, Line 8,
"mary sand secondary seals 364, 366 and the ambient environ-" should read
--mary and secondary seals 364, 366 and the ambient environ- --;

Col. 6, Line 58,
"prevent the letter from inadvertent rotation. Locking mecha-" should read
--prevent the latter from inadvertent rotation. Locking mecha- --; and

Claims

Col. 8, Claim 5, Line 50,
"of at least a two thousand gallons per minute that is" should read
--of at least two thousand gallons per minute that is--.

Signed and Sealed this
Fourteenth Day of June, 2016

Michelle K. Lee
*Director of the United States Patent and Trademark Office*